(12) United States Patent
Abramson et al.

(10) Patent No.: US 8,673,424 B2
(45) Date of Patent: Mar. 18, 2014

(54) SNAP IN WEATHERSTRIPPING

(75) Inventors: Steven Robert Abramson, Victor, NY (US); James Allan Micket, Webster, NY (US)

(73) Assignee: Greenstar Technologies, LLC., Victor, NY (US)

( * ) Notice: Subject to any disclaimer, the term of this patent is extended or adjusted under 35 U.S.C. 154(b) by 771 days.

(21) Appl. No.: 12/832,959

(22) Filed: Jul. 8, 2010

(65) Prior Publication Data
US 2012/0009378 A1 Jan. 12, 2012

(51) Int. Cl.
B32B 3/02 (2006.01)
E06B 7/16 (2006.01)

(52) U.S. Cl.
USPC .......... 428/82; 428/88; 428/81; 428/95; 428/192; 428/193; 49/475.1; 49/489.1

(58) Field of Classification Search
USPC ......... 428/192, 193, 81, 82, 88, 95; 49/475.1, 49/489.1, 492.1, 493.1
See application file for complete search history.

(56) References Cited

U.S. PATENT DOCUMENTS

| 2,613,408 | A | | 10/1952 | Bailey | |
|---|---|---|---|---|---|
| 4,064,654 | A | * | 12/1977 | Olson | 49/489.1 |
| 4,246,304 | A | | 1/1981 | Dixon | |
| 4,458,450 | A | | 7/1984 | Young et al. | |
| 4,970,829 | A | | 11/1990 | Brautigam | |
| 5,095,658 | A | | 3/1992 | Anderhalden | |
| 5,107,622 | A | | 4/1992 | Fuchs et al. | |
| 5,253,457 | A | * | 10/1993 | Orth | 52/202 |
| 5,287,656 | A | | 2/1994 | Johnson | |
| 5,384,976 | A | * | 1/1995 | Hall | 49/489.1 |
| 5,438,802 | A | | 8/1995 | Johnson | |
| 6,128,859 | A | * | 10/2000 | Vance | 49/377 |
| 6,321,490 | B1 | * | 11/2001 | Vance | 49/377 |
| 6,341,449 | B1 | | 1/2002 | Stahl | |
| 6,530,190 | B2 | | 3/2003 | Conachen | |
| 7,335,412 | B2 | * | 2/2008 | Wylie | 428/88 |
| 2002/0194810 | A1 | * | 12/2002 | Conachen | 52/718.04 |
| 2004/0074719 | A1 | | 4/2004 | Loughney | |
| 2010/0252168 | A1 | | 10/2010 | Pawson et al. | |

FOREIGN PATENT DOCUMENTS

| EP | 82305395.4 | | 6/1983 |
|---|---|---|---|
| EP | 0081288 | | 6/1986 |
| EP | 0289568 | | 2/1992 |
| WO | WO 03/100151 | A1 | 12/2003 |
| WO | WO 2007/149088 | | 12/2007 |
| WO | WO 2009155940 | A1 * | 12/2009 |

* cited by examiner

Primary Examiner — Cheryl Juska
(74) Attorney, Agent, or Firm — Robert D. Gunderman, Jr.; Patent Technologies, LLC

(57) ABSTRACT

A snap in weatherstripping where the backing has a plurality of alternating notched out spaces along each side to facilitate ease of insertion into a channel without the need to slide the weatherstripping longitudinally into the channel. The snap in weatherstripping can be pushed into the channel with a gentle side to side or rolling motion, thus eliminating the difficulties associated with longitudinally sliding a weatherstripping into a channel. The snap in arrangement of the weatherstripping eases replacement, and also accommodates variations in tolerance between the weatherstripping and the channel, making it desirable for replacement of existing degraded weatherstripping.

17 Claims, 3 Drawing Sheets

SNAP IN WEATHERSTRIPPING

BACKGROUND OF THE INVENTION

1. Field of the Invention

This application relates generally to weatherstripping, and more particularly to a snap in weatherstripping that eases the installation and replacement of weatherstripping for windows, doors, and other members.

2. Description of Related Art

Weatherstripping is commonly used to seal windows, doors, and similar structures from air, moisture, sound, mold, dust, and pest infiltration. Weatherstripping creates a barrier that typically deforms sufficiently to allow the window or door to open and close properly, but creates a somewhat impervious barrier. There are many types of weatherstripping on the market, including brass or metal strips, felt strips, blown rubber and extruded rubber strips, and brush or pile strips.

Brush weatherstripping is commonplace, and relies on a pile made of polypropylene or similar fibrous material. Oftentimes brush weatherstripping has a backing that can be inserted in a slot that traverses either the perimeter of the fenestration or the door or window placed in the fenestration. The slot may be a T shaped channel that accommodates the backing of the weatherstripping. The weatherstripping backing is commonly pushed longitudinally into the channel where it is held in place. As more of the weatherstripping length is inserted into the channel and pushed along longitudinally for placement, friction increases and it becomes progressively harder to push longer pieces of weatherstripping into the channel. When a window, door or similar structure is produced, this may not represent a hardship, as automation equipment may be employed to place the weatherstripping into the channel. Unfortunately, weatherstripping does not last forever, and eventually requires replacement. When the time comes to replace channelized weatherstripping, it is often difficult to place new weatherstripping into the existing channel of the window or door assembly. The channel may have deformed ever so slightly over time, or may contain dirt and debris that interfere with the smooth sliding of the weatherstripping into the channel. Or the previous weatherstripping may have been so far deteriorated that removal of the previous weatherstripping left fragments behind in the channel. All of these difficulties make the replacement of channelized weatherstripping an unsavory and sometimes problematic undertaking.

What is needed is a channelized weatherstripping that does not rely on the longitudinal insertion of the weatherstripping backing into a channel. It is therefore an object of the present invention to provide a weatherstripping with a novel backing that can be snapped into an existing weatherstripping channel without longitudinal insertion. It is another object of the present invention to provide a weatherstripping with a flexible yet strong backing that can be snapped into an existing weatherstripping channel. It is yet another object of the present invention to provide a weatherstripping that can be easily installed as a replacement weatherstripping.

These and other objects of the present invention will be further brought to light upon reading this specification and claims and viewing the attached drawings.

BRIEF SUMMARY OF THE INVENTION

In accordance with the present invention, there is provided a snap in weatherstripping comprising a backing of plastic material wherein the backing is of an elongated shape and having alternating notched out spaces along each side of the backing to facilitate ease of insertion into a channel; and a weatherstripping material extending from the backing where the weatherstripping material is mechanically attached to the backing in a generally longitudinally extending arrangement.

The foregoing paragraph has been provided by way of introduction, and is not intended to limit the scope of the invention as described by this specification, claims, and the attached drawings.

BRIEF DESCRIPTION OF THE DRAWINGS

The invention will be described by reference to the following drawings, in which like numerals refer to like elements, and in which.

The present invention will be described in connection with several preferred embodiments; however, it will be understood that there is no intent to limit the invention to the embodiments described. On the contrary, the intent is to cover all alternatives, modifications, and equivalents as may be included within the spirit and scope of the invention as defined by this specification, claims, and the attached drawings.

DESCRIPTION OF THE PREFERRED EMBODIMENTS

Figure 5:
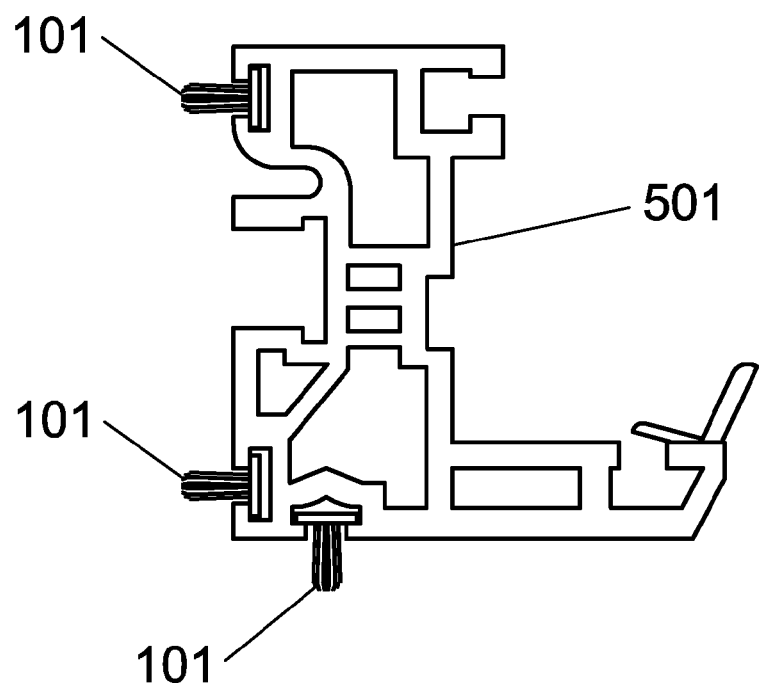
FIG. 5 is a cross sectional view of a typical installation of the snap in weatherstripping in an exemplary extruded frame.
Figure 6:
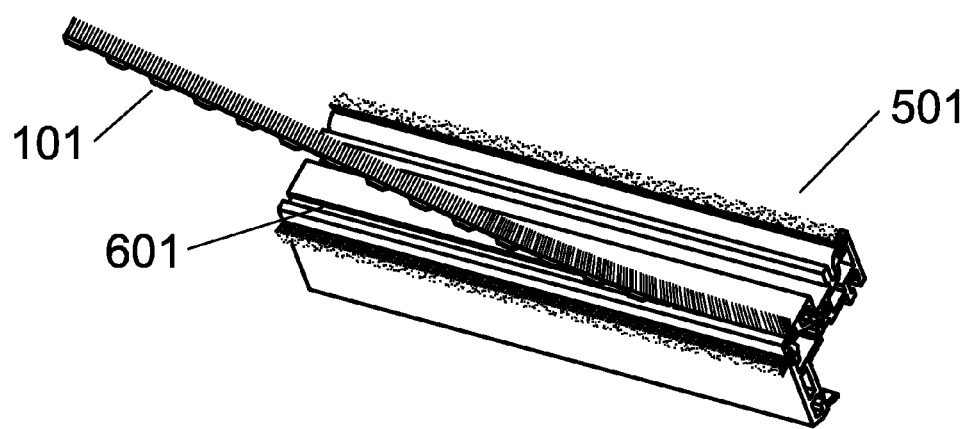
FIG. 6 depicts the snap in weatherstripping being installed in an exemplary extruded frame.
Figure 7:
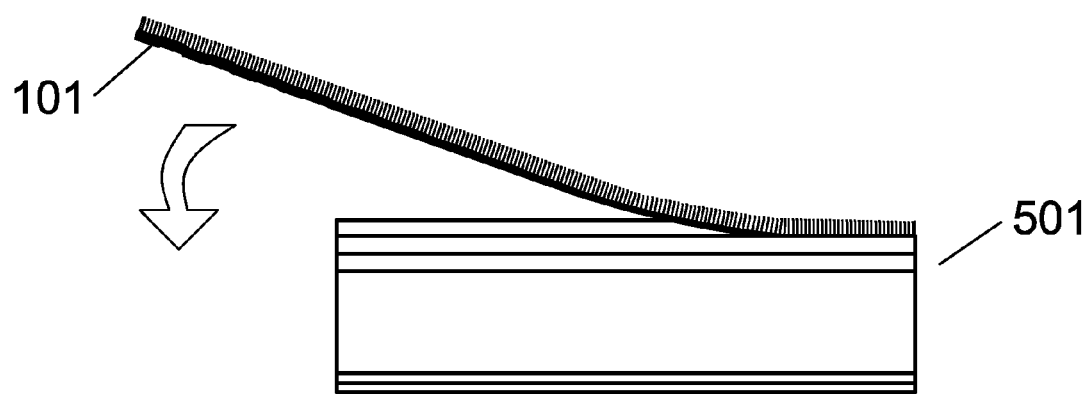
FIG. 7 further depicts the snap in weatherstripping being installed in an exemplary extruded frame.

FIGS. 1-4 depict one embodiment of the present invention. FIG. 5 depicts an exemplary installation of one embodiment of the present invention, and FIGS. 6 and 7 depict one embodiment of the present invention being installed in an extruded frame for a window or door.

Weatherstripping commonly contains a backing and a weatherstripping material such as pile fibers, a plush material, closed cell foam, metal, vinyl, foam rubber, felt, silicone, and other natural and manmade materials. The present invention and the various embodiments depicted and envisioned herein are not limited to a specific type of weatherstripping material, but rather, the backing of the present invention may be adapted to many materials and still be within the spirit and broad scope of the present invention as described herein.

Figure 1:
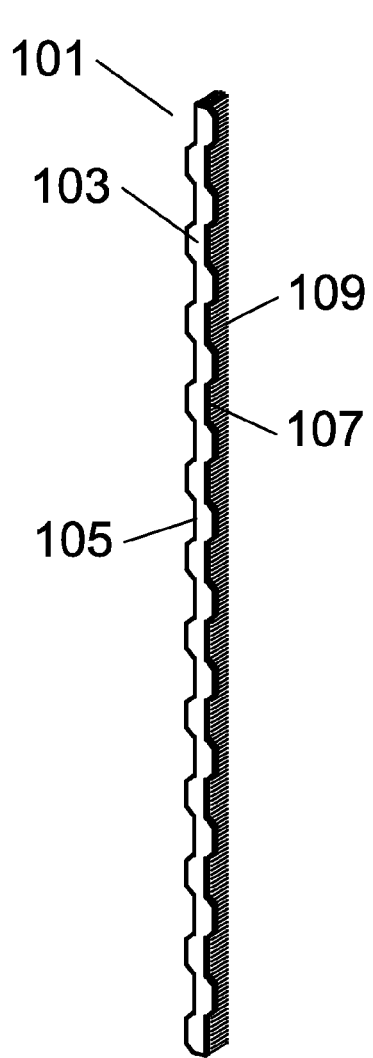
FIG. 1 is a perspective view of the back side of the snap in weatherstripping.

FIG. 1 is a perspective view or the back side of the snap in weatherstripping 101 of the present invention. Depicted is a backing 103 that may be made from a plastic or similar material. Suitable plastic's include, but are not limited to, polypropylene, nylon, and the like. The backing 103 is a strip of material that is formed by conventional means such as, in the case of a plastic, cut from sheet stock, extruded, or the like. Suitable backing widths include, but are not limited to, 0.155 inches, 0.187 inches, 0.229 inches, 0.250 inches, 0.270 inches, 0.300 inches, or similar standard widths that will allow for ease of manufacturing as well as convenient replacement of old weatherstripping. Formed in the backing 103 is a notched out space 105 and an alternate notched out space 107. Such an arrangement is made by techniques known to those skilled in the art, and may include mechanical cutting, laser cutting, stamping, heat processing, injection molding, and the like. The notched out space may be rectangular in shape, or may be angled. For example, an angle of 135 degrees provides good performance when snapping the weatherstripping of the present invention into a slot or T-channel. The present invention is not limited to a specific angular arrangement, and may vary based on material, application, temperature and climate conditions, and the like. In addition, the two angles that make up the notched out space 105 and the alternate notched out space 107 are not necessarily the same angle, but may be in some embodiments. In addition while the notched out space 105 and alternate notched out space 107 comprise a repeating pattern, the pattern need not be entirely symmetrical or of the spacing, although in some embodiments of the present invention the repeating patters is in fact symmetrical and of the same spacing.

Further depicted in FIG. 1 are pile fibers 109 that are an exemplary material that may be used to affix to the backing 103 to provide a suitable weather barrier. The pile fibers 109 may be made from polypropylene, polyester, nylon, or the like. As stated previously, other weatherstripping materials may also be used. The pile fibers 109 are commonly made as a yarn of synthetic material, but may also be made from natural materials such as plant and animal fibers, or the like. The weatherstripping material such as the pile fibers 109 are attached to the backing 103 through techniques such as adhesive bonding, ultrasonic welding, heat bonding, or mechanical bonding using means such as a retaining structure affixed to or made a part of the backing 103. Such retaining structures may include, but are not limited to, longitudinal strips or a longitudinal channel, pressure fit slots, and the like. U.S. Pat. No. 3,175,256 to Horton entitled "Weather Strip" discloses an early pile weatherstripping. U.S. Pat. No. 3,690,038 to Dieterich entitled "Recessed Weather Strip Body" further discloses a channelized weatherstripping. The entire disclosure of each of these patents being incorporated herein by reference.

Figure 2:
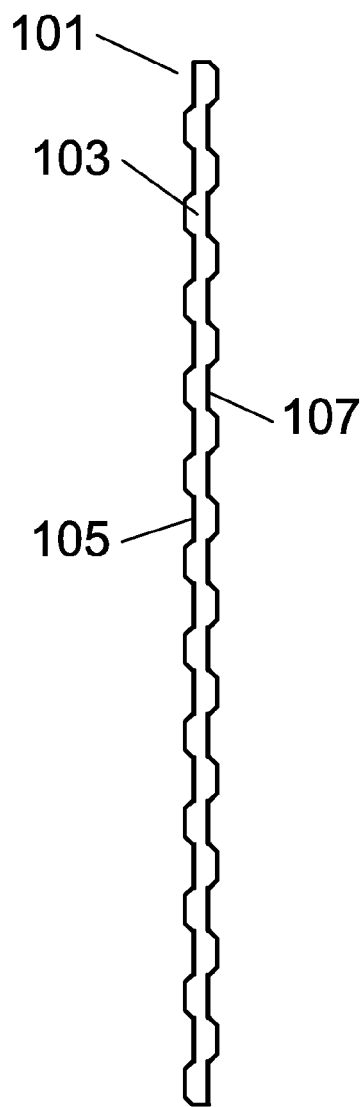
FIG. 2 is a plan view of the back side of the snap in weatherstripping.

FIG. 2 shows a plan view of the back side of the snap in weatherstripping. The segmented notched design depicted allows the weatherstripping material, such as a polypropylene pile backing, to be flexible enough to snap into the throat of at slot or similar channel thus allowing the snap in weatherstripping of the present invention to have a zipper snap in effect as it is rolled into place during installation. A screen spline tool. Or pizza cutter like tool may be useful for installation. The novel configuration of the backing with the alternating notched out spaces allows for ease of installation and further is more forgiving should tolerances be off in a channel or t slot. The width of the notched out space 105 and alternate notched out space 107 may be, by way of example and not limitation, 0.125 inch, 0.250 inch, or the like.

Figure 3:
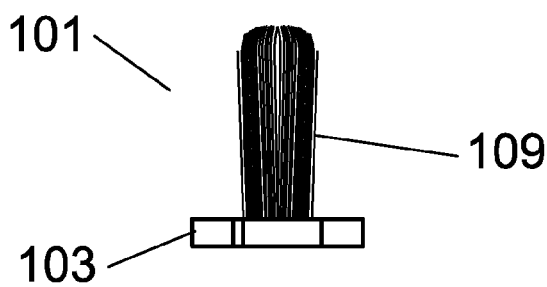
FIG. 3 is an end view of the snap in weatherstripping.

FIG. 3 is an end view of the snap in weatherstripping 101 of the present invention. In FIG. 3, the backing 103 can be seen with pile fibers 109 terminating on the backing 103. The termination of the pile fibers may be by way of adhesive bonding, ultrasonic welding, mechanical fastening, heat bonding, and the like. In some embodiments, additional structure may be added to the backing 103 to facilitate fastening of the weatherstripping material such as pile fibers 109. Such structures may include longitudinal strips, channels, clips, or similar structures known to those skilled in the art.

Figure 4:
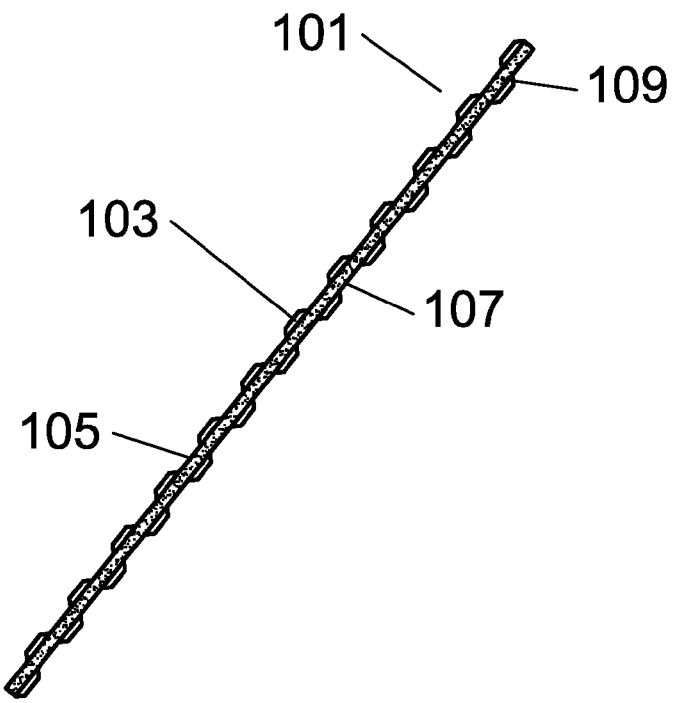
FIG. 4 is an upward plan view of the snap in weatherstripping.

FIG. 4 is an upward plan view of the snap in weatherstripping 101 showing pile fibers 109. Other embodiments of the present invention may incorporate other forms of weatherstripping material.

FIG. 5 is a cross sectional view of a typical installation of the snap in weatherstripping in an exemplary extruded frame 501. The extruded frame may be a vinyl, PVC, or a similar plastic. FIG. 5 depicts three snap in weatherstripping pieces (101); other frames may have more or less. The frame may also be made from other materials such as wood, aluminum, or the like. As depicted in FIG. 5, the snap in weatherstripping 101 is positioned within a T channel and retained in place through the structure of the channel combined with the geometry and frictional characteristics of the snap in weatherstripping 101.

Installation of the snap in weatherstripping involves pushing down on the weatherstripping structure while snapping the weatherstripping into the channel or T slot as opposed to pushing it longitudinally into the channel or T slot. This makes for a much easier installation over other channelized weatherstripping products in the replacement market. The notched out areas make the snap in weatherstripping flexible, yet enough material is left to maintain overall strength of the snap in weatherstripping to allow for long term structural placement of the replacement part. FIG. 6 depicts the snap in weatherstripping 101 being installed in an exemplary extruded frame 501. As can be seen in FIG. 6, the snap in weatherstripping 101 is being inserted into a channel 601 or T slot through a side to side motion. FIG. 7 shows another view of the snap in weatherstripping 101 being installed in an extrusion 501. As the snap in weatherstripping 101 is installed in the channel 601, a thin roller tool such as a screen spline tool or a pizza cutter type tool may be rolled along the length of the snap in weatherstripping 101 to facilitate installation with a zipper like snap in effect. The structure of the snap in weatherstripping and the ease of installation allow for easy retrofit, and accommodates tolerance variations as well as dirty, distorted, or otherwise problematic channels or T slots.

While the present invention and the various embodiments described herein are by example directed at fenestration products such as doors and windows for buildings, the snap in weatherstripping of the present invention would be equally well suited for other applications such as automotive doors, trunks, t-tops, convertible tops, and the like, boat components, or any application where a weatherstripping may be applied.

It is, therefore, apparent that there has been provided, in accordance with the various objects of the present invention, a snap in weatherstripping. While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the present invention as defined by this specification, claims and the attached drawings.

What is claimed is:

1. A snap in weatherstripping comprising:
    a backing of plastic material wherein said backing is of an elongated shape defining opposite sides and having alternating notched out spaces along each side edge of said hacking to facilitate ease of insertion into a channel; and
    a weatherstripping material extending from said backing where the weatherstripping material is mechanically attached to said backing in a generally longitudinally extending arrangement.

2. The snap in weatherstripping of claim 1 wherein said alternating notched out spaces contain a generally right angle.

3. The snap in weatherstripping of claim 1 wherein said alternating notched out spaces contain an angle of about one hundred and thirty five degrees.

4. The snap in weatherstripping of claim 1 wherein said weatherstripping material comprises polypropylene.

5. A snap in weatherstripping for use with as frame having at least one channel, said snap in weatherstripping comprising:
 a backing having an elongated shape defining opposite sides with alternating notched out spaces along each side edge for facilitating insertion of said backing into the channel; and
 a weatherstripping material extending from said backing with said weatherstripping material being mechanically attached to said backing.

6. The snap in weatherstripping of claim 5 wherein said alternating notched out spaces contain a generally right angle.

7. The snap in weatherstripping of claim 5 wherein said alternating notched out spaces contain an angle of about one hundred and thirty five degrees.

8. The snap in weatherstripping of claim 5 wherein said weatherstripping material comprises to pile material.

9. The snap in weatherstripping of claim 5 wherein said weatherstripping material comprises a plush material.

10. The snap in weatherstripping of claim 5 wherein said weatherstripping material comprises a closed cell foam material.

11. The snap in weatherstripping of claim 5 wherein said weatherstripping material comprises a metal.

12. The snap in weatherstripping of claim 5 wherein said weatherstripping material comprises vinyl.

13. The snap in weatherstripping of claim 5 wherein said weatherstripping material comprises a foam rubber material.

14. The snap in weatherstripping of claim 5 wherein said weatherstripping material comprises a felt.

15. The snap in weatherstripping of claim 5 wherein said weatherstripping material comprises silicone.

16. The snap in weatherstripping of claim 5 wherein said backing is formed of a plastic material and said weatherstripping material is further defined as a pile of fiber segments.

17. The snap in weatherstripping of claim 5 wherein said backing is formed of a plastic material.

* * * * *